(12) United States Patent
Martin et al.

(10) Patent No.: US 9,618,119 B2
(45) Date of Patent: Apr. 11, 2017

(54) SEALING ELEMENT

(71) Applicant: Durr Systems GmbH, Bietigheim-Bissingen (DE)

(72) Inventors: Herbert Martin, Weinstadt (DE); Michael Baumann, Flein (DE); Thomas Buck, Sachsenheim (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 14/377,892

(22) PCT Filed: Feb. 13, 2013

(86) PCT No.: PCT/EP2013/000422
§ 371 (c)(1),
(2) Date: Aug. 11, 2014

(87) PCT Pub. No.: WO2013/120609
PCT Pub. Date: Aug. 22, 2013

(65) Prior Publication Data
US 2014/0367922 A1    Dec. 18, 2014

(30) Foreign Application Priority Data
Feb. 14, 2012  (DE) .................. 10 2012 002 888

(51) Int. Cl.
*F16J 15/06*    (2006.01)
*F16J 15/10*    (2006.01)

(52) U.S. Cl.
CPC .............. *F16J 15/06* (2013.01); *F16J 15/106* (2013.01)

(58) Field of Classification Search
CPC .. F16J 15/02; F16J 15/021; F16J 15/06; F16J 15/10; F16J 15/104; F16J 15/106
See application file for complete search history.

(56) References Cited

U.S. PATENT DOCUMENTS 2,552,750 A * 5/1951 Thornhill ................ F16L 23/20
                                                    277/614
3,020,054 A    2/1962 Driancourt
(Continued)

FOREIGN PATENT DOCUMENTS

CN    1407260 A    4/2003
CN    101925765 A    12/2010
(Continued)

OTHER PUBLICATIONS

International Search Report dated May 27, 2013 (2 pages).
(Continued)

*Primary Examiner* — Gilbert Lee
(74) *Attorney, Agent, or Firm* — Bejin Bieneman PLC (57) ABSTRACT

A sealing element, e.g., a sealing ring, is adapted to seal between two component sections and to be compressed by the two component sections in a groove that is provided in one of the two component sections and having a groove opening and a groove bottom. The sealing element comprises a profile which, in the non-compressed state, comprises different profile heights and at least two outer surfaces. The profile is deformable in the compressed state such that it extends with at least one of its side sections into the groove opening (NÖ) and thereby possibly partially closes the groove opening.

25 Claims, 5 Drawing Sheets

(56) References Cited

U.S. PATENT DOCUMENTS

| | | | | |
|---|---|---|---|---|
| 3,078,110 | A * | 2/1963 | Starr | F16J 15/0881 |
| | | | | 277/614 |
| 3,472,523 | A * | 10/1969 | Carlson, Jr. | F16J 15/024 |
| | | | | 277/649 |
| 3,479,063 | A * | 11/1969 | Raver | F16L 17/067 |
| | | | | 277/614 |
| 3,550,990 | A * | 12/1970 | Carlson, Jr. | F16J 15/106 |
| | | | | 277/566 |
| 3,746,348 | A * | 7/1973 | Stone | F16J 15/061 |
| | | | | 277/609 |
| 4,511,152 | A * | 4/1985 | Fournier | F16J 15/025 |
| | | | | 277/584 |
| 5,002,290 | A | 3/1991 | Procal | |
| 5,687,976 | A | 11/1997 | Andrick et al. | |
| 5,797,603 | A * | 8/1998 | Voirol | F16J 15/106 |
| | | | | 277/314 |
| 6,264,206 | B1 | 7/2001 | Hashizawa et al. | |
| 6,305,695 | B1 * | 10/2001 | Wilson | F16J 15/024 |
| | | | | 277/584 |
| 6,523,833 | B1 * | 2/2003 | Ishigaki | F16J 15/062 |
| | | | | 277/549 |
| 2006/0097461 | A1 * | 5/2006 | Tsuji | F16J 15/106 |
| | | | | 277/637 |
| 2006/0290075 | A1 * | 12/2006 | Tani | F02F 11/002 |
| | | | | 277/628 |
| 2009/0014963 | A1 * | 1/2009 | Fietz | F16J 15/025 |
| | | | | 277/402 |
| 2010/0140881 | A1 * | 6/2010 | Matsuo | F16J 15/106 |
| | | | | 277/648 |
| 2010/0264606 | A1 * | 10/2010 | Hayashi | F16J 15/061 |
| | | | | 277/641 |
| 2014/0084018 | A1 * | 3/2014 | Onillon | F16J 15/064 |
| | | | | 221/1 |
| 2015/0233475 | A1 * | 8/2015 | Yu | F16J 15/104 |
| | | | | 277/590 |

FOREIGN PATENT DOCUMENTS

| | | |
|---|---|---|
| DE | 69001691 T2 | 1/1994 |
| DE | 19848563 A1 | 6/1999 |
| EP | 0718529 A2 | 6/1996 |
| EP | 2236865 A1 | 10/2010 |
| FR | 2535813 A1 | 5/1984 |
| GB | 2328989 A | 3/1999 |
| JP | H9-329240 | 12/1997 |
| JP | 2001-516851 A | 10/2001 |
| JP | 2006-97807 A | 4/2006 |
| WO | 99/13249 A1 | 3/1999 |

OTHER PUBLICATIONS

Written Opinion (5 pages; German).

Notification of Reasons for Rejection from JPO on JP Application No. 2014-556954 mailed Jan. 10, 2017 (English translation; 5 pages).

* cited by examiner

SEALING ELEMENT

CROSS-REFERENCE TO RELATED APPLICATIONS

This application is a National Phase of, and claims priority to, International Application No. PCT/EP2013/000422, filed on Feb. 13, 2013, which claims priority to German Application No. DE 10 2012 002 888.1, filed on Feb. 14, 2012, which applications are hereby incorporated by reference in their entirety.

BACKGROUND

In paint technology, sealing elements are required in order to seal against paint, for example, to seal flange packages, to seal colour screw joints, atomiser interfaces, colour changer interfaces, and/or colour pressure regulator interfaces, etc. A typical sealing element seals between two component sections and is placed in a groove which is provided in one of the two component sections. The aim is a pressure-stable and dead space-free seal in order to prevent leakage and colour carry-over, while simultaneously preventing groove over-filling which could possibly cause gap extrusion. Conventional sealing elements are typically designed as rectangular or circular sealing rings or as O-ring seals. Conventional sealing rings are typically associated with at least one of the following disadvantages:

Groove over-filling, gap extrusion;
Leakage and colour carry-over due to the lack of dead space freedom; and
Low compressive strength, particularly under dynamic compressive loading.

SUMMARY

A sealing element is disclosed, e.g., for a coating system component. The sealing element may be configured as a sealing ring. The sealing element is arranged to seal between two component sections and to be compressed by the two component sections in a groove which is provided in one of the two component sections. The sealing element generally comprises a profile with at least two outer surfaces which can lie opposite one another. The profile can comprise different profile heights in a width direction.

The profile may be deformed in the compressed state such that it extends into the groove opening with one of its side sections and thereby may close the groove opening, for example, on one side at least partially in a width direction. In this way, it is possible, in particular, at least to reduce leakage or to reduce fluid or liquid carry-over (e.g. colour/paint carry-over).

The at least one side section may be provided at an outer surface facing away from the groove bottom and/or represents, for example, a side end section in a width direction of the profile.

It is possible for the profile to be deformed in a compressed state such that it extends with two of its side sections into the groove opening and thereby can close the groove opening, for example, on both sides at least partially in a width direction.

In an, the profile is deformed in the compressed state such that it also extends between the two side sections into the groove opening. By this means, it can be made possible, in particular, for the groove opening to be closed preferably at least almost dead space-free, for example, at least over the entire groove width and/or groove opening width.

The at least two side sections may be provided at the outer surface facing away from the groove bottom and/or represent side end sections, for example, in the width direction of the profile.

The profile may be deformed in the compressed state such that it extends in the groove opening over the whole groove width or even therebeyond. Alternatively or in addition, the profile can be deformed in the compressed state such that one of the outer surfaces extends, for example, in the groove opening over the whole groove width or even therebeyond, for example, substantially in a straight line. The outer surface of the profile which faces away from the groove bottom can be pressed in the compressed state, for example, by a straight-line component section. It is worth mentioning that in a non-limiting embodiment, the groove width defines the groove opening width.

It is possible for the profile to be arranged to seal against a fluid (e.g. paint or another liquid) in the compressed state. The profile is, e.g., paint-resistant and/or solvent-resistant. The profile may be deformed in the compressed state such that the groove is sealed against penetration of a fluid and, in this manner, for example, leakage or carry-over of fluid or liquid can be prevented or at least reduced.

It is possible that the profile diminishes in cross-section, e.g., by predetermined different profile heights, in particular tapers, such that gap extrusion and/or groove over-filling can at least be reduced or can even be prevented. The profile can therefore be deformed in the compressed state such that gap extrusion and/or groove over-filling which could lead to gap extrusion, can be prevented or at least reduced.

It should be mentioned that gap extrusion does not occur in particular for the reason that, for example, tolerances are selected such that on assembly on block, the sealing element seals the dead space. In particular, due to the construction, the sealing element cannot become jammed in the gap.

The groove opening can comprise a widening region.

The profile can be deformed in the compressed state such that (e.g. in the width direction, on one side or both sides) it protrudes into the widening region. In this case, it is even possible for the profile to extend in the compressed state (e.g. in the width direction on one or both sides) beyond the groove width and/or groove opening width. For example, the profile can extend with one of its side sections or with two of its side sections into the widening region.

It is possible for the profile to be deformed in the compressed state such that a dead space is created between the groove bottom and the profile.

The profile comprises a maximum profile width and a maximum profile height in the non-compressed state. The groove generally comprises a groove width and a groove height.

It is possible for the maximum profile width in the non-deformed state of the profile to be greater than the groove width and/or for the maximum profile height in the non-deformed state of the profile to be greater than the groove height.

In an embodiment, the ratio of (an appropriate maximum) profile width to (an appropriate maximum) profile height in the non-compressed state is in the range from 1.0 to 1.35 or even 1.5, in particular in the range of ≥1.0; 1.2; or 1.4; and/or of ≤1.1; 1.3 or 1.5.

The ratio of (an appropriate maximum) groove width to (an appropriate maximum) groove height may be in the range from 1.2 to 2.1, in particular in the range of ≥1.2; 1.4; 1.6; 1.8; 2.0 or 2.2; and/or of ≤1.3; 1.5; 1.7; 1.9; 2.1 or 2.3.

The profile can be arranged such that both in the minimum configuration and in the maximum configuration, gap extrusion can at least be reduced and suitably, pressing of the sealing element into the flange region (groove over-filling) can at least be reduced.

It is possible that, in the non-compressed state of the profile, the region of the profile which defines the maximum profile height is arranged off-centre relative to the profile width.

For example, in the non-compressed state, the profile can form, in cross-section, a substantially triangular or trapezoid base body the outer surfaces of which, however, can be provided with elevations and/or depressions. Furthermore, the corners thereof can be reduced (e.g. rounded and/or chamfered).

It is possible for at least one of the at least two outer surfaces to be provided with at least one projection/support section.

In the non-compressed state of the profile, the at least one projection section generally projects from the outer surface on which said projection section is formed. In particular, the at least one projection section is adapted to stabilise the sealing element in the compressed state (e.g. to reduce or prevent unwanted tilting or slippage of the sealing element). In an, both outer surfaces are each provided with at least one projection section which suitably extend in opposing directions. Sufficient compressive strength/compression stability can be ensured, in particular, by means of the projection section(s), preferably also under dynamic compressive loading in the pressure range of, for example, over 14, 15 or even, 16 bar.

It is possible that, in the non-compressed state, the profile in the region of the at least one projection section has a profile height which is smaller than the maximum profile height.

It is possible that the profile is arranged such that, in the compressed state of the profile, the at least one projection section is deformed at least almost completely into the profile interior and thus hardly or no longer projects from the outer surface to which it is assigned.

Possibly, in the non-compressed state, the at least one projection section extends at least partially over the centre of the profile width.

It is possible that, in the non-compressed state, the profile tapers in cross-section from the region that defines the maximum profile height toward one, and preferably toward both, sides. In particular, the profile can taper up to the at least one projection section and from the at least one projection section, preferably, further up to a lateral profile end. The profile can also taper toward the other lateral profile end.

In the non-compressed state, the profile can comprise, in cross-section, at least one reduced corner region which, in the compressed state, is at least partially filled by the profile. Preferably, in the non-compressed state of the profile, a reduced corner region is provided at the outer surface facing away from the groove bottom.

It is possible that, in the non-compressed state of the profile, the at least two side surfaces enclose, in sections, a taper angle of less than or equal to 60°, 50°, 40°, 30°, or 20°.

The sealing element is suitable, e.g., for a coating system component (e.g. a colour/paint screw joint, atomiser, atomiser interface, colour changer, colour pressure regulator, colour changer interface and/or colour pressure regulator interface, valve, valve interface, etc.).

The groove may be an annular groove and/or is arranged substantially rectangular in cross-section (e.g. with rounded or chamfered corners in the groove opening and/or groove bottom region). The width of the groove opening (groove opening width) may correspond to the width of the groove (groove width). However, embodiments are possible wherein the groove has different widths in cross-section, for example, arranged as an essentially trapezoid groove.

It is possible that a groove arranged as an annular groove has an internal diameter, and a sealing element arranged as a sealing ring has an internal diameter. Suitably, the internal diameter of the sealing ring is smaller in the non-compressed and/or non-deformed starting state than the internal diameter of the annular groove. The sealing element is therefore possibly adapted to be clamped into the annular groove.

It is possible that, in the non-compressed and/or non-deformed state, the region of the profile which defines the maximum profile height is arranged at least close to the internal diameter of the sealing element in order to suitably seal here at least in a dead space low manner, and/or the profile tapers toward the outer diameter, suitably in order to provide space for the volume of the profile to be displaced.

Also, the groove opening can be designed with a variety of configurations, for example, as a widening groove opening.

The profile may be a full profile which can be made, for example, from an elastic material.

The non-compressed state can include, in particular, the non-compressed and/or non-deformed starting state of the profile and/or of the sealing element.

The disclosed subject matter includes a sealing arrangement (e.g. a flange seal) with a sealing element as described herein, two component sections and a groove, which is provided in one of the two component sections and comprises a groove opening and a groove bottom. The sealing arrangement can comprise the sealing element in the compressed state, or in the non-compressed state.

Also included in this disclosure is a coating system component (e.g. a flange seal, colour/paint screw joint, atomiser, atomiser interface, colour changer, colour regulator, colour changer interface and/or colour pressure regulator interface, valve, valve interface, etc.) with two component sections and a groove, which is provided in one of the two component sections and comprises a groove opening and a groove bottom. A sealing element which is compressed by the two component sections and which seals between the two component sections is inserted into the groove. The sealing element comprises a profile with at least two outer surfaces and/or suitably, in the non-compressed state, with different profile heights. The profile is deformed such that it extends into the groove opening with one of its side sections and thereby preferably closes the groove opening partially. Furthermore, the sealing element can be arranged as described herein.

BRIEF DESCRIPTION OF THE DRAWINGS

The features and exemplary embodiments as described herein can be combined with one another as desired. Other advantageous developments of the invention are disclosed in the subclaims or are contained in the description below of exemplary embodiments, making reference to the accompanying drawings, in which:

DETAILED DESCRIPTION OF EXEMPLARY EMBODIMENTS

Figure 1:
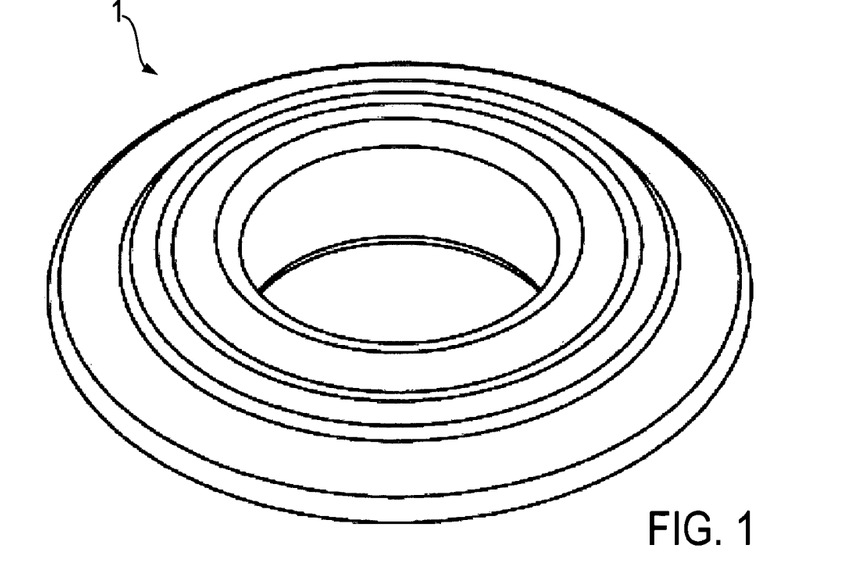
FIG. 1 shows a perspective view of a sealing element according to an embodiment in the non-compressed (non-deformed) state.
Figure 2:
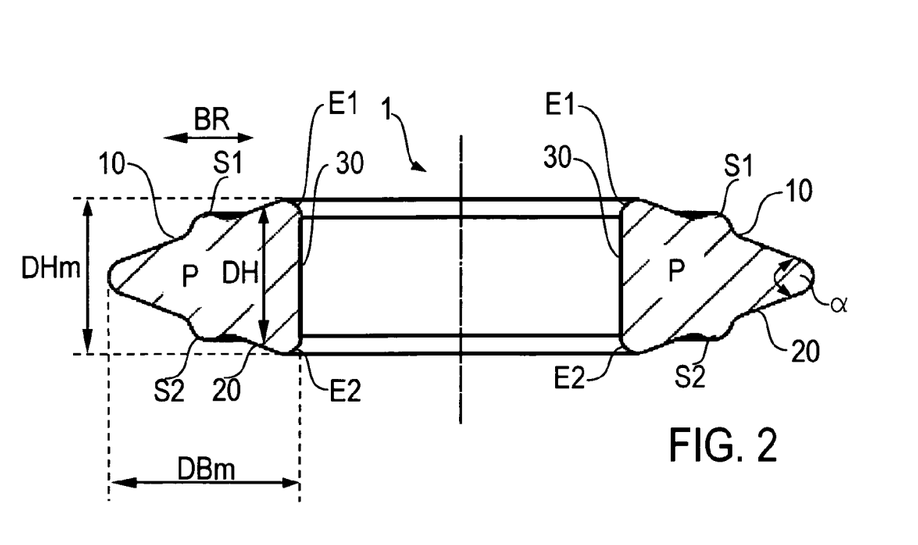
FIG. 2 shows the sealing element of FIG. 1 in cross-section in the non-compressed state.
Figure 3:
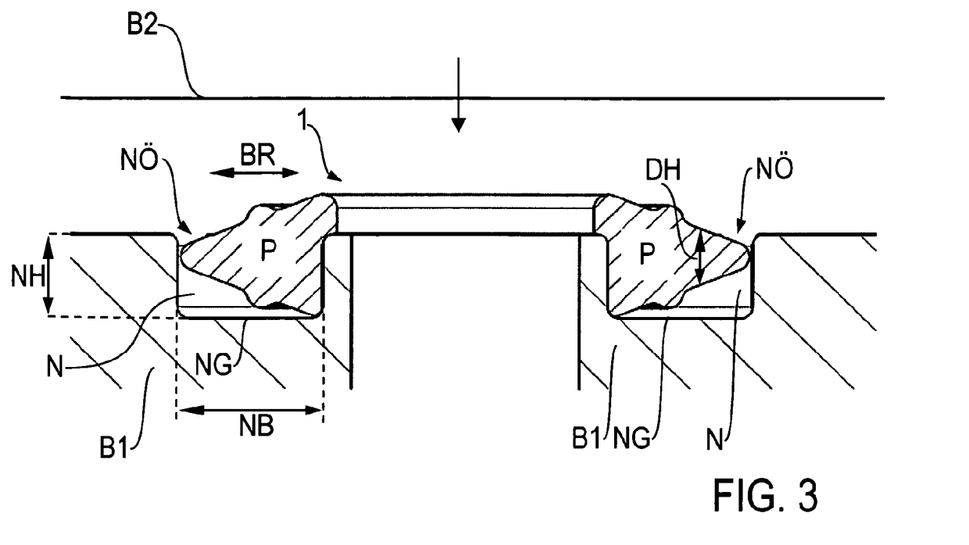
FIG. 3 shows the sealing element of FIGS. 1 and 2 in cross-section in a partially deformed state.

FIG. 1 shows a perspective view of a sealing element 1 in the form of a sealing ring, whilst FIG. 2 shows the sealing element 1 in cross-section. FIGS. 1 and 2 show the sealing element 1 in the non-deformed and/or non-compressed (starting) state. FIG. 3 shows the sealing element 1 of FIGS. 1 and 2 in cross-section in a partially deformed state, while it is brought from the non-compressed state to the compressed state.

Figure 4:
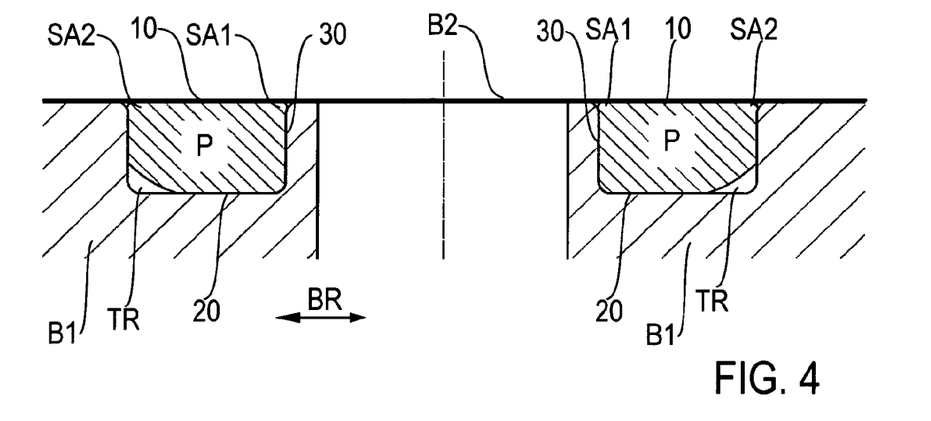
FIG. 4 shows the sealing element of FIGS. 1 to 3 in cross-section in the compressed state.

The sealing element 1 is arranged to seal, in the compressed state, between two component sections B1 and B2, and to be compressed by the two component sections B1 and B2 in a groove N, as can be shown in FIGS. 3 and 4. The groove N comprises a groove opening NÖ, a groove bottom NG, a groove width NB and a groove height NH. As shown in FIGS. 3 and 4, the groove N is a substantially rectangular groove in cross-section, but is also able to assume other configurations in the context of the invention. The groove width NB defines the groove opening width, so that the groove opening width corresponds to the groove width NB.

As shown in FIGS. 2 and 3, the sealing element 1 comprises a profile P which has three outer surfaces 10, 20 and 30. The profile P comprises, in its width direction BR, various profile heights DH, for example, a maximum profile height DHm. The profile P also comprises a maximum profile width DBm. The region of the profile P which defines the maximum profile height DHm is arranged off-centre relative to the profile width. The base body of the profile P is arranged substantially triangularly or trapezoidally in cross-section and comprises rounded corners.

FIG. 2 shows that the outer surface 10 is provided with a projection section S1. Alternatively or in addition, the outer surface 20 can be provided with a projection section S2. The projection section S1 stands out from the outer surface 10 and the projection section S2 stands out from the outer surface 20. The two projection sections S1 and S2 extend at least partially over the centre of the profile width. The profile P has a profile height in the region of the two projection sections S1 and S2 which is smaller than the maximum profile height DHm. The projection sections S1 and S2 are adapted to at least reduce unwanted tilting or slippage of the sealing element 1 in the compressed state.

On the one hand, the profile P tapers from the region which defines the maximum profile height DHm to the projection sections S1 and S2 and further tapers from the projection sections S1 and S2, preferably to one lateral profile end. On the other hand, the profile P tapers from the region which defines the maximum profile height DHm to the other lateral profile end.

The profile P comprises, in cross-section, two reduced corner regions E1 and E2 which, in the compressed state, are at least partially filled by the profile P.

As is also shown in FIGS. 2 and 3, the two outer surfaces 10 and 20 enclose, in sections, a taper angle α of approximately 45°.

As shown, for example, in FIG. 3, the sealing element 1 is inserted into a groove N configured as an annular groove. The sealing element 1 has an inner diameter and the groove N configured as an annular groove has an inner diameter, wherein the inner diameter of the sealing element 1 in the non-deformed and/or non-compressed starting state of the sealing element 1 is smaller than the inner diameter of the groove N configured as an annular groove. The maximum profile height DHm of the profile P is configured to be at least close to the inner diameter of the sealing element 1 and suitably tapers from there toward the outer diameter.

It is shown in FIGS. 2 to 4 that, in the non-deformed state of the profile P, the maximum profile width DBm is greater than the groove width NB and the maximum profile height DHm is greater than the groove height NH. The ratio of the maximum profile width DBm to the maximum profile height DHm lies in the range from 1.0 to 1.35. The ratio of the groove width NB to the groove height NH lies in the range from 1.2 to 2.1.

FIG. 4 shows the sealing element 1 of FIGS. 1 to 3 in the compressed state. In the compressed state, the profile P comprises two side sections SA1 and SA2 which are arranged at the outer surface 10 facing away from the groove bottom NG and represent side end sections in the width direction BR of the profile P.

The profile P is deformed in the compressed state such that it extends, with the two side sections SA1 and SA2 into the groove opening NÖ and thus partially closes the groove opening NÖ on both sides, as a result of which leakage or paint/colour carry-over can at least be reduced. The profile P is further deformed in the compressed state such that it also extends between the two side sections SA1 and SA2 into the groove opening NÖ, as a result of which the groove opening NÖ is closed substantially dead space-free over the entire groove width NB. At the same time, the profile P has different profile heights DH which lead, in cross-section to a tapering or reduction of the profile P in one or both width directions BR such that groove over-filling which could lead, for example, to a gap extrusion, can be prevented or at least reduced.

It is also apparent from FIG. 4 that the profile P is deformed such that the projection sections S1 and S2 are pressed into the interior of the profile and therefore no longer project from the outer surfaces 10 and 20, while a dead space TR is generated between the groove bottom NG and the profile P.

Figure 7:
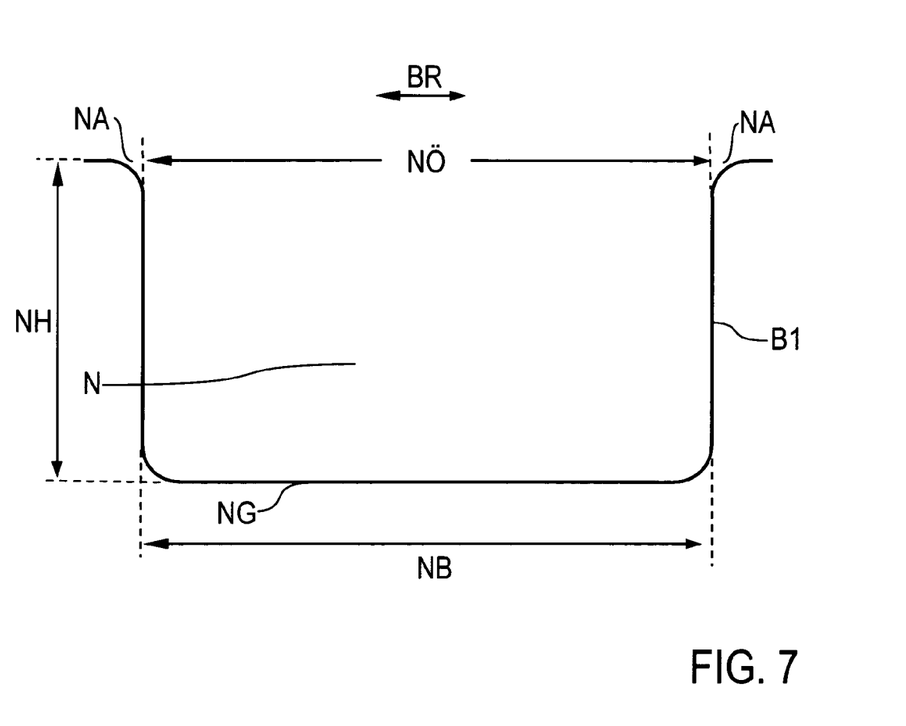
FIG. 7 shows an exemplary groove in cross-section on an enlarged scale.

FIG. 7 shows an exemplary groove N on an enlarged scale. The groove N according to FIG. 7 largely matches the exemplary embodiment described above, wherein similar or identical parts are provided with the same reference signs and, for the avoidance of repetition, reference is also made to the description above.

The groove N according to FIG. 7 is provided in the component section B1, is configured to be substantially rectangular in cross-section and comprises, for example, rounded corners. The groove N comprises a groove opening NÖ, a groove bottom NG, a groove height NH and a groove width NB. The groove opening NÖ has a groove opening width. The groove opening width corresponds to the groove width NB. As is shown in FIG. 7, the groove opening NÖ can be configured, for example, as a widening groove opening and can thus comprise a widening region NA. The reference sign BR identifies the width direction of the groove N, of the groove opening NÖ and of the widening region NA.

In the event that the groove opening NÖ, as shown in FIG. 7, comprises a widening region NA, the profile P can suitably be configured such that, in the compressed state, it protrudes preferably on both sides with its two side sections SA1 and SA2 into the widening region NA and at least reduces the widening region NA in the width direction BR thereof.

Figure 5:
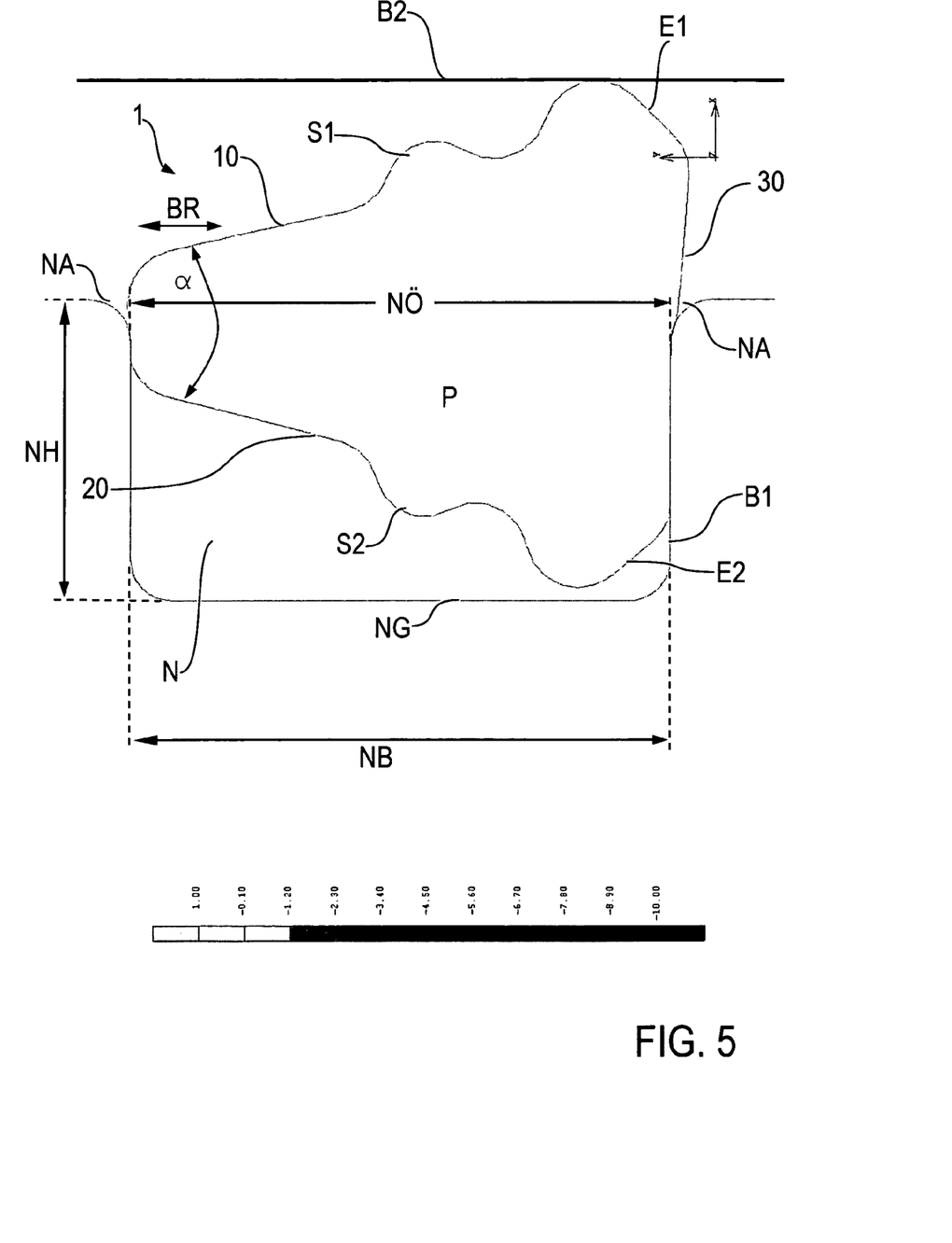
FIG. 5 shows a stress diagram of a sealing element according to another embodiment in cross-section in a partially deformed state.
Figure 6:
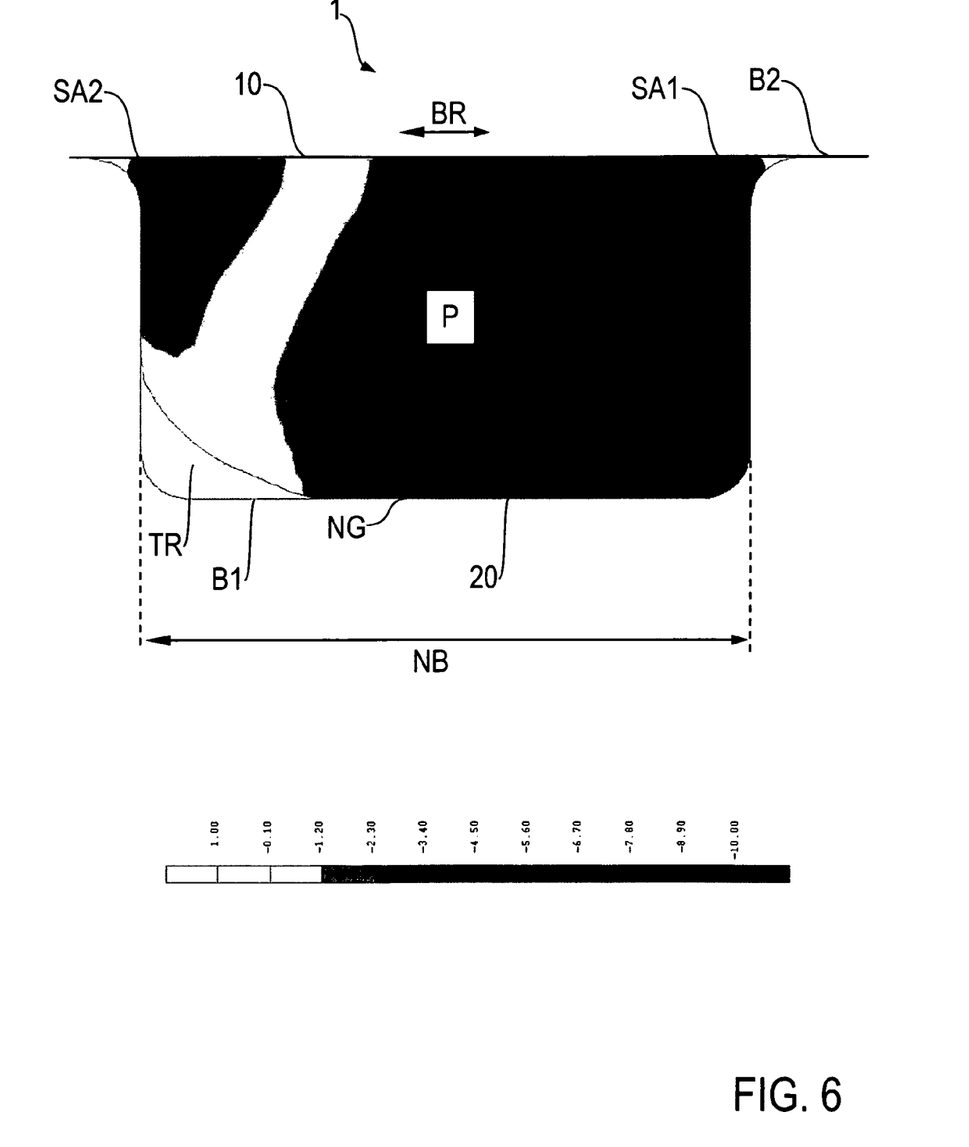
FIG. 6 shows a stress diagram of the sealing element of FIG. 5 in cross-section in the compressed state.

FIG. 5 shows a part of a sealing element, according to an embodiment, in cross-section in a partially deformed state, whilst it is brought from the non-compressed state to the compressed state. FIG. 6 shows a stress diagram of the sealing element 1 of FIG. 5 in cross-section in the compressed state.

The sealing element according to FIGS. 5 and 6 largely matches the exemplary embodiments described above, wherein similar or identical parts are provided with the same reference signs and, for the avoidance of repetition, reference is also made to the description above.

The groove opening width again corresponds to the groove width NB. From FIGS. 5 and 6, it is again apparent, in particular, that the profile P is arranged to be deformed in the compressed state such that it also extends not only with two of its side sections SA1 and SA2 into the groove opening NÖ and therefore closes the groove opening NÖ on both sides in sections, but also extends between the two side sections SA1 and SA2 in the groove opening NÖ and therefore can close the groove opening NÖ over the whole of the groove width NB possibly at least almost dead space-free. The outer surface 10 is deformed by means of the component section B2 such that it extends essentially in a straight line over the entire groove width NB. It can also be seen that in the compressed state, the projection sections S1 and S2 are deformed into the interior of the profile and no longer project from the outer surfaces 10 and 20.

The groove N shown in FIGS. 5 and 6 comprises a groove widening region NA. In the compressed state, the profile P extends with two of the side sections SA1 and SA2 thereof into the widening region NA, as a result of which the widening region NA is reduced on both sides in its width direction BR.

The claimed invention is not restricted to the exemplary embodiments described above. Rather, a plurality of variants and deviations are possible

The invention claimed is:

1. A circular sealing element having an inner diameter and an outer diameter that is adapted to seal between two component sections and to be compressed by the two component sections in a groove, the groove having an inner diameter and an outer diameter wherein the groove is provided in one of the two component sections and has a groove opening and a groove bottom, the sealing element comprising:
   a profile that in a non-compressed state includes a plurality of profile heights the profile having a maximum profile height proximate its inner diameter and the profile having a minimum profile height proximate its outer diameter, and the inner diameter of the circular sealing element being smaller than the inner diameter of the groove;
   wherein the profile is deformable in a compressed state such that the profile extends with at least one side section into the groove opening such that the compressive stresses at the maximum profile height exceed the compressive stresses at the inner profile height.

2. The sealing element according to claim 1, wherein the profile is deformable in the compressed state such that the profile extends with at least two side sections into the groove opening.

3. The sealing element according to claim 2, wherein the profile is deformable in the compressed state such that the profile extends with the at least two side sections into the groove opening such that the groove opening is substantially free of dead space.

4. The sealing element according to claim 1, wherein the profile is deformable in the compressed state such that at least one of the following is achieved:
   the profile extends in the groove opening over at least the entire groove width,
   one of the outer surfaces extends over at least the entire groove width substantially in a straight line, and
   the profile closes the groove opening substantially free of dead space.

5. The sealing element according to claim 1, wherein the profile is arranged, in the compressed state to:
   seal against paint and is paint resistant and solvent resistant, and
   be deformed such that the groove is at least partially sealed against penetration of paint.

6. The sealing element according to claim 1, wherein the profile heights are arranged such that at least one of a gap extrusion and a groove over-filling is reduced or prevented.

7. The sealing element according to claim 1, wherein the groove opening is provided with a widening region and the profile is deformable in the compressed state such that the profile protrudes into the widening region.

8. The sealing element according to claim 1, wherein the profile is deformable in the compressed state such that a dead space is formed between the groove bottom and the profile.

9. The sealing element according to claim 1, wherein, in the non-compressed state of the profile, the maximum profile width is greater than the groove width and the maximum profile height is greater than the groove height.

10. The sealing element according to claim 1, wherein, in the non-compressed state of the profile, the ratio of the maximum profile width to the maximum profile height lies in a range from 1.0 to 1.35.

11. The sealing element according to claim 1, wherein the ratio of the groove width to the groove height lies in a range from 1.2 to 2.1.

12. The sealing element according to claim 1, wherein, in the non-compressed state of the profile, a region of the profile that defines the maximum profile height is off-centre with respect to the profile width.

13. The sealing element according to claim 1, wherein, in the non-compressed state of the profile, the profile is formed, in cross-section, by a substantially triangular or trapezoidal base body.

14. The sealing element according to claim 1, wherein, in the non-compressed state of the profile:
   at least one of the at least two outer surfaces is provided with at least one projection section that projects from the outer surface on which it is formed, or
   the two outer surfaces are respectively provided with at least one projection section which project from a respective one of the outer surfaces on which the at least one projection section is formed.

15. The sealing element according to claim 14, wherein, in the non-compressed state of the profile, the profile has, in a region of the at least one projection section, a profile height that is smaller than a maximum profile height.

16. The sealing element according to claim 14 wherein, in the non-compressed state of the profile, the at least one projection section extends at least partially over a centre of a profile width.

17. The sealing element according to claim 14, wherein, in the compressed state of the profile:
the at least one projection section is deformed into the profile interior, and
the at least one projection section is adapted to stabilise the sealing element.

18. The sealing element according to claim 14, wherein, in the non-compressed state of the profile, from a region that defines a maximum profile height, in cross-section the profile tapers on one side up to the at least one projection section and further, from the at least one projection section, up to a lateral profile end and, on the other side, to the other lateral profile end.

19. The sealing element according to claim 1, wherein, in the non-compressed state of the profile, the profile has, in cross-section, at least one reduced corner section, which, in the compressed state, is filled at least partially by the profile.

20. The sealing element according to claim 1, wherein, in the non-compressed state of the profile, the at least two outer surfaces enclose, in sections, a taper angle ($\alpha$) of one of $\leq 50°$, $40°$, $30°$.

21. The sealing element according to claim 1, wherein the groove is substantially rectangular in cross-section and is an annular groove.

22. The sealing element according to claim 1, wherein:
in the non-compressed state of the profile, the profile tapers toward the outer diameter.

23. The sealing element according to claim 1, wherein the sealing element is a sealing ring for a coating system component.

24. A sealing arrangement, comprising a circular sealing element having an inner diameter and an outer diameter, two component sections and a groove provided in one of the two component sections and having a groove opening and a groove bottom the groove further having an inner diameter and an outer diameter, the inner diameter of the circular sealing element being smaller than the inner diameter of the groove, wherein the sealing element comprises:
a profile that in a non-compressed state includes a plurality of profile heights and at least two outer surfaces;
wherein the profile is deformable in a compressed state such that the profile extends with at least one side section into the groove opening and the inner diameter of the sealing element is under higher compression than the outer diameter of the sealing component.

25. A coating system component, comprising:
two component sections, and
a groove that is provided in one of the two component sections and that has a groove opening and a groove bottom,
wherein a circular sealing element having an inner diameter and an outer diameter, the inner diameter having a profile height and the outer diameter having a profile height, the inner diameter profile height being substantially greater than the outer diameter profile height and the sealing element being compressed by the two component sections and seals between the two component sections is inserted into the groove, the inner diameter of the circular sealing element being smaller than an inner diameter of the groove,
wherein the inner diameter is under a higher compression than the outer diameter when the sealing element is in a compressed state.

* * * * *